3,632,544
SELF-EXTINGUISHING POLYMERIC COMPOSITIONS

Nicodemus E. Boyer, Parkersburg, W. Va., assignor to Borg-Warner Corporation, Chicago, Ill.
No Drawing. Filed May 7, 1970, Ser. No. 35,582
Int. Cl. C08f 45/46; C08g 51/46
U.S. Cl. 260—30.4 R                 6 Claims

ABSTRACT OF THE DISCLOSURE

Novel thermoplastic blends that are self-extinguishing by virtue of having incorporated therein a heterocyclic adduct containing two norbornene rings. The compound has the general formula

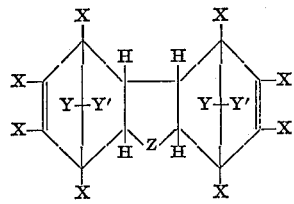

Formula I wherein X is a halogen group; Y and Y' are selected from the group consisting of hydrogen, halogen (preferably chlorine, bromine, or fluorine), lower (1–4C) alkyl, alkoxy, halogen substituted alkyl and substituted alkoxy radicals and Z is selected from the group consisting of sulfur and oxygen. The heterocyclic adduct compound lends flame retardant characteristics to the thermoplastic composition. The furan adducts may be prepared by reacting one mole of furan with two moles of a halogenated cyclopentadiene of the formula

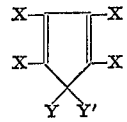

Formula II wherein each X is chlorine, fluorine or bromine and Y and Y' are each selected from the group consisting of hydrogen, halogen (preferably chlorine, bromine, or fluorine), lower (1–4C) alkyl, alkoxy and halogen-substituted alkyl and substituted alkoxy radicals. Analogous compounds may be prepared by reacting thiophene with a compound of the general Formula II.

---

In order to improve the hot flow of resins, particularly ABS (acrylonitrile-butadiene-styrene) graft polymers containing an additive of the general Formula I as the principal fire retardant, it is often advisable to add a secondary flame retardant which may contain only one chlorinated norbornene ring, such as the acrylonitrile norbornene adduct or ANB (Formula III) or the cyclohexene norbornene adduct (Formula IV).

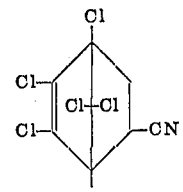

Formula III (ANB) (M.P. 143°–146° C.)

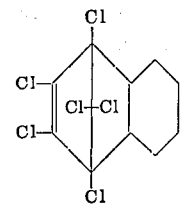

Formula IV (CHNB) (M.P. 77°–78° C.)

BACKGROUND AND SUMMARY OF INVENTION

This invention is directed to novel flame retardant thermoplastic compositions prepared by blending a heterocyclic adduct containing two norbornene rings with a thermoplastic polymeric material.

In order for a thermoplastic polymer to utilize flame retardant components or additives, the resin should not be adversely affected by the additive; i.e., the physical properties of the thermoplastic such as impact strength, flexural strength, flow characteristics, modulus, etc., should not be unduly impaired.

The flame retardant additive used to provide the blends of this invention is extremely compatible with thermoplastics such as acrylonitrile-butadiene-styrene (ABS) graft polymers as well as a variety of other resins. For examples, the additive is extremely compatible with polyacrylonitrile and poly (styrene-acrylonitrile) copolymer and does not impair appreciably the physical properties of the resins.

The thermoplastic compositions to which the additive has been added, in accordance with this invention, are not adversely affected as a result of the addition, and in some cases, have decreased hardness and brittleness and improved flow characteristics in addition to the self-extinguishing characteristics previously mentioned.

Some of the more prevalently used thermoplastic compositions to which the heterocyclic adduct of this invention is added, are ABS polymers, polyurethane, polyethylene, polypropylene, acrylate polymers such as poly (methylmethacrylate), poly(vinyl chloride), polyisoprene, polystyrene, linear polybutadiene, cross-linked polybutadiene, polyisobutylene, polyamides, poly (styrene-acrylonitrile), ethylenepropylene rubber, ethylene-propylene copolymers, acrylic polymers (such as poly (methyl methacrylate) and other acrylate ester homopolymers and copolymers), polycarbonates, polysulfonates, polysulfones, polyphenylene oxide as well as graft polymers, copolymers, mixtures thereof and the like.

The additive used to prepare the blends of this invention is stable at the normal processing temperatures of the aforementioned polymers, i.e., polymeric materials, and does not discolor the polymers or have an adverse affect on the flow characteristics thereof. The additive is also compatible with the thermoplastic materials and does not sublime or decompose at the normal processing temperatures of these polymers. The use of the flame retardant components to prepare the flame retardant blends has been found to be an extraordinarily economical method of preparing flame retardant thermoplastic compositions and in many instances, the physical properties of the thermoplastics are improved instead of impaired.

In some instances, it is advantageous to use mixtures of fire retardants of this invention. For examples, if the high-melting 2:1 molar adduct of hexachlorocyclopentadiene and furan (FNB, Example 1 below) is used as the principal fire retardant, the low-melting adducts ANB (Formula III) and/or CHNB (Formula IV above)

can be used as the secondary fire retardant additive for improved hot flow properties and diminished brittleness of the resin blends. Other useful synergistic additives include inorganic antimony and boron compounds such as antimony (III) oxide and zinc borate. These are usually added in somewhat smaller quantities than the principal fire retardant of the general Formula I.

The invention will be more clearly understood from a reading of the following exampels in which a method of preparing the additive as well as preparing the blends will be set forth to illustrate the invention. It will be understood, however, that the examples are not meant to in any way limit the invention nor restrict the invention to specific recipes and/or conditions.

EXAMPLE 1

Preparation of an adduct of hexachlorocyclopentadiene with furan in a 2:1 molar ratio (FNB or $C_{14}H_4OCl_{12}$) and its use as a fire retardant additive A solution of 4.4 parts by weight of 2,6-di-tert.-butyl-4-metrylphenol in 2182.4 parts by weight of hexachlorocyclopentadiene ($C_5Cl_6$) was preheated to 100° C. in a nitrogen atmosphere. 272.3 parts of furan was added to the solution dropwise from a dropping funnel over 26 hours at a temperature range of 100–145° C. The addition rate was kept slow, with a vertical condenser attached to the reactor, to minimize the reflux of furan. At the end of the addition, the reflux stopped and mechanical stirring became difficult due to the presence of a large amount of white crystals.

The crystals obtained were isolated by filtration at room temperature and the solid product on the filter was identified as a 2:1 molar Diels-Alder adduct of $C_5Cl_6$ and furan. The product was dried to constant weight in a vacuum oven at room temperature and the yield was 1262.8 parts having a melting point of 289–295° C.

The furan adduct contained two norbornene rings and is referred to herein as "FNB." The adduct has an empirical formula of $C_{14}H_4OCl_{12}$ and the structural Formula V set forth below.

50 parts of furan were added to the filtrate to compensate for losses by evaporation during filtration. The period of addition took 15 hours at 142–167° C. Two additional portions of FNB were obtained by filtration and drying and the total yield was 2268.4 parts. The yield was 92.4%.

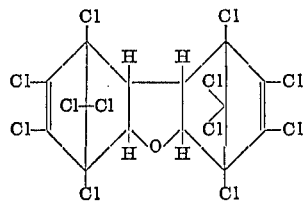

Formula V (FNB)

The compound FNB has been reported before in the literature in a low yield (16%), however, it has not been used as a fire retardant in resins; C. A. Peri, Gazzetta chimica italiana 85, 1118 (1955).

The thermal stability of FNB, as an additive to thermoplastics, was found to be excellent. An ABS graft polymer was successfully injection-molded at about 475° F. in the presence of FNB as a fire retardant additive without discoloration, sublimation or fume formation. Compositions with about 15% FNB and 7% antimony oxide and other minor additives, such as stabilizers and plasticizers, passed the UL flame retardant test. The ABS compositions were self-extinguishing, no dripping, under the flammability test.

30–40% by weight of FNB was added to 100 parts by weight of polyethylene and polypropylene along with 10–20 parts by weight antimony oxide. Self-extinguishing resins were obtained as measured by the same UL test.

The FNB of the example set forth was mixed with a series of thermoplastic resins as set forth herein below.

TABLE I

Use of FNB as a fire retardant in thermoplastic

| Name of material: | Parts by weight |
|---|---|
| ABS resin (graft polymer) | 56 |
| 30% butadiene, 45% styrene | |
| 25% acrylonitrile | |
| ABS graft-terpolymer blend | 20 |
| 12 parts ABS graft polymer | |
| 12.5% butadiene | |
| 59.5% styrene | |
| 28% acrylonitrile | |
| 8 parts ABS terpolymer of | |
| 55% butadiene | |
| 20% styrene | |
| 25% acrylonitrile | |
| FNB additive | 24 |
| Antimony oxide ($Sb_2O_3$) | 8 |
| Resin stabilizer (sulfur-free organotin compound) | 1.0 |
| Lubricant mold release (80% polyoxyethylene and 20% of polyoxypropylene) | 0.5 |
| Whitener and plasticizer (microcrystalline wax) | 1.5 |
| Total parts by weight | 111.0 |

The materials set forth in Table I above were milled for 7–12 minutes at about 115° F. In the milling process, there was no sublimation, discoloration or undesirable fumes. Bars and plaques compounded from the resin containing FNB were found to be creamwhite (the parent color of ABS) with no streaking or discoloration from milling or injection-molding at 475° F. The samples passed the UL test, No. 94, at 60 ml. thickness, Group I, with no dripping.

EXAMPLE 2

Another example of application of FNB and ABS resin is:

TABLE II

| Ingredients: | Parts by weight |
|---|---|
| FNB (or $C_{14}H_4OCl_{12}$) | 21.62 |
| ABS graft polymer resin | 50.43 |
| 30% butadiene | |
| 45% styrene | |
| 25% acrylonitrile | |
| ABS graft-terpolymer blend | 18.03 |
| 12 parts ABS graft polymer | |
| 12.5% butadiene | |
| 59.5% styrene | |
| 28% acrylonitrile | |
| 8 parts ABS terpolymer of | |
| 55% butadiene | |
| 20% styrene | |
| 25% acrylonitrile | |
| Antimony oxide ($Sb_2O_3$) | 7.21 |
| Stabilizer (Thermolite 25) | 0.91 |
| Plasticizer and mold release (Pluronic F-38) | 0.45 |
| Whitener and plasticizer (Mekon White, a wax) | 1.35 |
| Total parts by weight | 100.00 |

As in Example 1, the composition was milled for 8 minutes at 295° F. to produce a white resin, which was self-extinguishing. The resin had excellent thermal stability, no discoloration at 475° F. when injection-molded. The sample passed the vertical UL test, No. 94, Group I (no drip). The impact strength was 5.7 ft.-lb./in.

EXAMPLE 3

The same as Example 2, above, except that 10 parts of FNB (Formula V), 7 parts of ANB (Formula III), and 7 parts of $Sb_2O_3$ were used per total of 100 parts, increasing accordingly the graft polymer to obtain 100 parts as in the above list of ingredients. The product had an appearance similar to Example II and there were identical testing results.

EXAMPLE 4

The same as Example 2, above, except that 5 parts of CHNB (Formula IV), 12 parts of FNB (Formula V), and 7 parts of $Sb_2O_3$ were used, and the percentage of graft polymer was increased to a total of 100 parts by weight as in the above table. The product had an appearance similar to Example II and there were virtually identical testing results (impact 6.0).

EXAMPLE 5

By reaction of 2 moles of hexachlorocyclopentadiene ($C_5Cl_6$) and 1 mole of thiophene or a compound as set forth below was obtained.

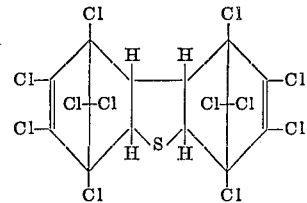

The trivial name "thiophene norbornene derivative" or TNB was given. In the previous example, the trivial name was "furan norbornene derivative" or FNB.

TABLE III

| Example No. | The first reactant | The second reactant | X | Y | Y' | Z |
|---|---|---|---|---|---|---|
| 6 | Br₂C(CBr=CBr)₂ Hexabromocyclopentadiene (orange-yellow crystals) | Furan | Br | Br | Br | O |
| 7 | Hexabromocyclopentadiene | Thiophene | Br | Br | Br | S |
| 8 | 1,1-dimethoxy-2,3,4,5-tetrachloro-2,4-cyclopentadiene (a pale yellow liquid). | Furan | Cl | —OCH₃ | —OCH₃ | O |
| 9 | 1,1-dimethoxy-2,3,4,5-tetrachloro-2,4-cyclopentadiene (a pale yellow liquid). | Thiophene | Cl | —OCH₃ | —OCH₃ | S |
| 10 | 1,1-diethoxy-2,3,4,5-tetrachloro-2,4-cyclopentadiene (a pale yellow liquid). | Thiophene | Cl | —OC₂H₅ | —OC₂H₅ | S |
| 11 | 1,1-di-n-butoxy-2,3,4,5-tetrachloro-2,4-cyclopentadiene (a pale yellow liquid). | Furan | Cl | —OC₄H₉ | —OC₄H₉ | O |
| 12 | 1,1-difluoro-2,3,4,5-tetrachloro-2,4-cyclopentadiene (a pale yellow liquid). | Furan | Cl | F | F | O |
| 13 | 1,1-di-(β-chloroethoxy)-2,3,4,5-tetrachloro-2,4-cyclopentadiene (a pale yellow liquid) | Furan | Cl | —OCH₂CH₂Cl | —OCH₂CH₂Cl | O |
| 14 | 1-ethyl-1,2,3,4,5-pentachloro-2,4-cyclopentadiene (a pale yellow liquid). | Furan | Cl | Cl | —C₂H₅ | O |
| 15 | 1-(β-chloroethyl)-1,2,3,4,5-pentachloro-2,4-cyclopentadiene (a pale yellow liquid). | Furan | Cl | Cl | —CH₂CH₂Cl | O |

TNB has been reported in the literature as a chemical curiosity (N. Neeman and A. Modiano, Abstracts of Papers Presented at the 131st Meeting of the American Chemical Society, Miami, Fla., Apr. 7–12, 1957, pages 83–100) but it has heretofore found no practical application. TNB is a white, crystalline solid. It was found that TNB has a similar utility as FNB in the resins. Very similar testing results were achieved when TNB was substituted for FNB in tests with ABS resins (see Example 1), with the difference that FNB had a slightly higher thermal stability, whereas TNB had the advantage of improving the hot flow of ABS resins. FNB, as the sole fire retardant, slightly decreased the hot flow of ABS resins which necessitated a higher injection-molding temperature and pressure (or the addition of some flow-improving fire retardant with FNB, such as TNB, or CHNB, ANB, etc., as mentioned above).

EXAMPLES 6–15

Examples of halogen-containing cyclopentadienes (the first of the two reactants) which can be used successfully are the following (Table III). The second reactant is furan or thiophene. The reactions are carried out at similar conditions as in Example I.

The products from Examples 6 and 7 were brown solid, and from other examples (8-15 inclusive) white solids were obtained. The ingredients are listed above in Table III; the molar ratio was always 2 moles of the halogen-containing cyclopentadiene to one mole of furan or thiophene. Solvents were not required, although they were occasionally used; solvents failed to improved the yield, as a rule. After heating under conditions approximately similar to those of Example 1, the products were isolated by cooling the reaction mixture, recrystallizing from the organic solvents and drying. The products were successfully employed as fire retardants in ABS, polystyrene, poly-SAN, and other resins by a similar procedure as given in Example 1. The structural formulas of the compounds of some examples are set forth below.

Example 8

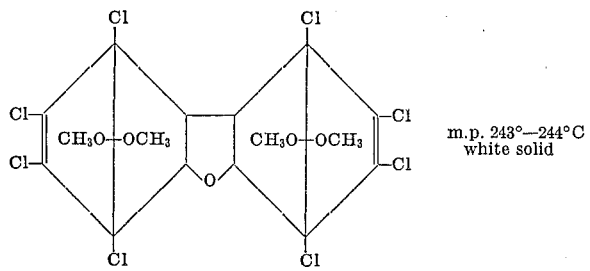

m.p. 243°—244°C
white solid

Example 9

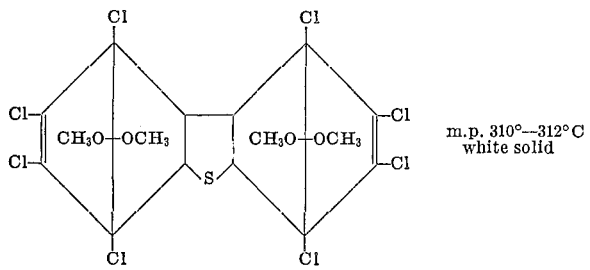

m.p. 310°—312°C
white solid

Example 10

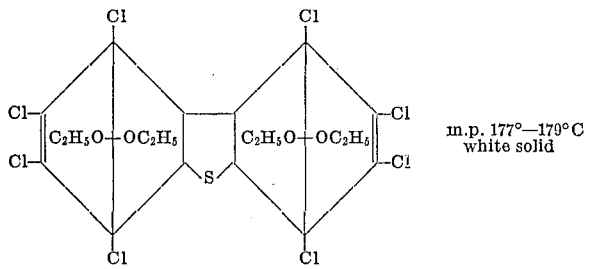

m.p. 177°—179°C
white solid

The aforementioned examples are set forth merely to illustrate the invention in exemplary thermoplastic compositions and are not meant to be exclusive of other examples. It will be understood that while this invention was described with certain specific embodiments thereof, this is by way of illustration and not by way of limitation and that the scope of the invention is defined solely by the appended claims which should be construed as broadly as is consistent with the prior art.

I claim:

1. A flame retardant polymeric composition comprising from about 70–95% of a polymeric base selected from the group consisting of acrylonitrile-butadiene-styrene polymers, polyurethanes, polyethylenes, polypropylenes, acrylate polymers, poly(vinyl chloride), polystyrene, polyisoprene, linear polybutadiene, polyisobutylenes, polyamides, poly(styrene-acrylonitrile), ethylene-propylene rubber, ethylenepropylene copolymers, acrylic polymers, polycarbonates, polysulfonates, polysulfones and polyphenylene oxide polymers blended with from about 5–30% of a furan or thiophene adduct of the general formula

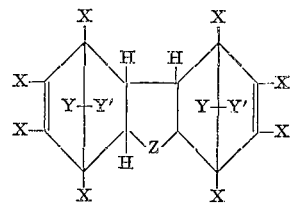

wherein X is a halogen group; Y and Y' are selected from the group consisting of hydrogen, halogen, lower (1–4C) alkyl, alkoxy and halogen susbtituted alkyl and substituted alkoxy radicals and Z is selected from the group consisting of sulfur and oxygen.

2. The composition of claim 1 where X, Y, and Y' are selected from the group consisting of chlorine, bromine, and fluorine.

3. The composition of claim 1 wherein the fire retardant compound is the 2:1 molar adduct of hexachlorocyclopentadiene and furan, blended with an ABS resin.

4. The composition of claim 1 wherein a lower-melting halogenated norbornene derivative selected from the group consisting of 1:1 molar ratito acrylonitrile-hexachlorocyclopentadiene adduct, 1:1 molar ratio cyclohexene-hexachlorocyclopentadiene adduct, antimony oxide and zinc borate are added in an amount up to about 14% of the total composition to the polymeric base as fire retardants and hot flow improvers.

5. The composition of claim 4 wherein the polymeric base is an acrylonitrile-butadiene-styrene (ABS) graft polymer and wherein the 2:1 molar ratio adduct of hexachlorocyclopentadiene-furan, and the 1:1 molar ratio adduct of cyclohexene-hexachlorocyclopentadiene and antimony oxide are added to the graft polymer.

6. The composition of claim 1 where the 2:1 molar ratio adduct of 1,1-dimethoxy-2,3,4-tetrachloro-2,4-cyclopentadiene and thiophene is added as the flame retardant to the polymeric base.

References Cited

UNITED STATES PATENTS

| | | | |
|---|---|---|---|
| 3,356,688 | 12/1967 | Mark | 260—346.2 M |
| 3,382,204 | 5/1968 | Gouinlock | 106—15 FP |
| 3,437,673 | 4/1969 | Schmerling | 260—31.8 HA |
| 3,489,715 | 1/1970 | Bierwirth | 106—15 FP |

MORRIS LIEBMAN, Primary Examiner

P. R. MICHL, Assistant Examiner

U.S. Cl. X.R.

106—15 FP; 260—30.2, 30.4 A, 30.4 N, 45.8 R, 45.8 A

UNITED STATES PATENT OFFICE
CERTIFICATE OF CORRECTION

Patent No. 3,632,544   Dated January 4, 1972

Inventor(s) Nicodemus E. Boyer

It is certified that error appears in the above-identified patent and that said Letters Patent are hereby corrected as shown below:

Column 8, line 49, after "1,1-dimethoxy-2,3,4" should read --,5--.

Signed and sealed this 31st day of October 1972.

(SEAL)
Attest:

EDWARD M. FLETCHER, JR.
Attesting Officer

ROBERT GOTTSCHALK
Commissioner of Patents

Notice of Adverse Decision in Interference

In Interference No. 98,122 involving Patent No. 3,632,544, N. E. Boyer, SELF-EXTINGUISHING POLYMERIC COMPOSITIONS, final judgment adverse to the patentee was rendered Mar. 6, 1975, as to claims 1, 2 and 3.

[*Official Gazette March 23, 1976.*]